(12) United States Patent
Zhang et al.

(10) Patent No.: US 9,571,543 B2
(45) Date of Patent: Feb. 14, 2017

(54) USING QUALITY INFORMATION FOR ADAPTIVE STREAMING OF MEDIA CONTENT

(71) Applicant: FUTUREWEI TECHNOLOGIES, INC., Plano, TX (US)

(72) Inventors: Shaobo Zhang, Shenzhen (CN); Alexander Giladi, Princeton, NJ (US); Xin Wang, Rancho Palos Verdes, CA (US); Yangpo Xu, Shenzhen (CN); Peiyun Di, Shenzhen (CN); Xin Liu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 185 days.

(21) Appl. No.: 14/156,139

(22) Filed: Jan. 15, 2014

(65) Prior Publication Data

US 2014/0201324 A1    Jul. 17, 2014

Related U.S. Application Data

(60) Provisional application No. 61/752,796, filed on Jan. 15, 2013, provisional application No. 61/752,831, filed on Jan. 15, 2013.

(51) Int. Cl.
*H04L 29/06* (2006.01)
(52) U.S. Cl.
CPC ....... *H04L 65/4084* (2013.01); *H04L 65/1069* (2013.01); *H04L 65/4092* (2013.01); *H04L 65/80* (2013.01)
(58) Field of Classification Search
CPC ............. H04L 65/1069; H04L 65/4048; H04L 65/4092; H04L 65/80; H04L 65/60; H04L 61/1564; H04L 61/1511; H04L 61/307; H04L 51/14; H04L 51/066; G06F 9/5061; G06F 15/17318; H04N 21/2393; H04N 21/23439; H04N 21/26258; H04N 21/2662; H04N 21/4532; H04N 21/4621; H04N 21/4622; H04N 21/44209; H04N 21/44008; H04N 21/64322; H04N 21/6373; H04N 21/8456
See application file for complete search history.

(56) References Cited

U.S. PATENT DOCUMENTS

2007/0268836 A1* 11/2007 Byun .................. H04L 12/2602
370/252
2009/0300204 A1* 12/2009 Zhang ................ H04N 21/2358
709/231
(Continued)

FOREIGN PATENT DOCUMENTS

EP          2410745 A1    7/2011
WO    2011047335 A      4/2011
(Continued)

OTHER PUBLICATIONS

European Search Report Dated Oct. 22, 2015, 7 pages.

*Primary Examiner* — Chris Parry
*Assistant Examiner* — Stephen Houlihan
(74) *Attorney, Agent, or Firm* — Futurewei Technologies, Inc.

(57) ABSTRACT

Different representations are associated with an instance of media content, and a representation can include multiple portions of media content. A respective quality value and bitrate can be associated with each of the portions. Information about the instance of content, including bitrate and quality information, can be accessed by and/or sent to a client. The quality information indicates the availability of measures of quality (e.g., quality values) and where those quality values reside or how they can be retrieved. The client can use quality as well as bitrate to make more intelligent (Continued)

decisions while streaming the content. For example, while the content is being downloaded over a network, the client can adapt to changes in available network bandwidth by selecting one portion of the instance of media content over another based not just on its bitrate but also based on its quality value.

12 Claims, 6 Drawing Sheets

(56) References Cited

U.S. PATENT DOCUMENTS

| | | |
|---|---|---|
| 2010/0189183 A1 | 7/2010 | Gu et al. |
| 2011/0082914 A1* | 4/2011 | Robert ............... H04N 21/4788 |
| | | 709/219 |
| 2011/0119395 A1 | 5/2011 | Ha et al. |
| 2011/0211629 A1 | 9/2011 | Gustafsson et al. |
| 2011/0270913 A1 | 11/2011 | Jarnikov |
| 2011/0274361 A1* | 11/2011 | Bovik ............... G06K 9/00664 |
| | | 382/224 |
| 2014/0201382 A1* | 7/2014 | Shivadas ............... H04L 65/605 |
| | | 709/231 |

FOREIGN PATENT DOCUMENTS

| | | |
|---|---|---|
| WO | 2011121083 A | 10/2011 |
| WO | 2012100215 A | 7/2012 |
| WO | 2012109520 A | 8/2012 |
| WO | 2012134530 A1 | 10/2012 |

* cited by examiner

USING QUALITY INFORMATION FOR ADAPTIVE STREAMING OF MEDIA CONTENT

RELATED U.S. APPLICATIONS

This application claims priority to U.S. Provisional Application No. 61/752,796, titled "System and Method for In-band Signaling of Segment Quality for Smooth Adaptive Streaming," filed on Jan. 15, 2013, and also claims priority to U.S. Provisional Application No. 61/752,831, titled "System and Method for Out-of-band Signaling of Quality Information," filed on Jan. 15, 2013, both of which are hereby incorporated by reference in their entirety.

BACKGROUND

Video streaming is becoming more and more popular, with video traffic exceeding 50 percent of the total traffic over content distribution networks (CDNs) according to some estimates. DASH (Dynamic Adaptive Streaming over HyperText Transfer Protocol (HTTP)) is designed to promote efficient delivery of multimedia content from servers to clients through HTTP-based content distribution networks.

Adaptive streaming over HTTP allows streaming clients to switch between different representations of multimedia content that has been encoded (compressed) at multiple, different bitrates. Each representation may be divided into one or more segments, and each segment may be divided into one or more sub-segments. Bitrate information for each representation, either at the representation level or at the segment/sub-segment level, is provided to a client through a document containing metadata, referred to as Media Presentation Description (MPD). Based on that bitrate information, the client can switch from one representation to another according to the available bandwidth. Switching from one representation to another occurs at segment/sub-segment boundaries, referred to as stream access points (SAPs). Thus, the client may stream segments/sub-segments from a higher bitrate representation when more bandwidth is available, and may stream segments/sub-segments from a lower bitrate representation with less bandwidth is available. Generally speaking, bitrate-driven adaptive streaming is greedy in nature, because each client selects and streams the representation that has the highest possible bitrate that the client can handle and is within the amount of bandwidth that is available.

Bitrate can influence the level of quality, although quality is not solely dependent on bitrate. Fluctuations in quality can occur when bandwidth or bitrate varies over time, such as when a client switches back-and-forth between higher and lower bitrate representations as just described. Furthermore, the greedy nature of bitrate-driven adaptive streaming can, in some instances, intensify the degree and frequency of changes in available bandwidth as multiple streaming clients and applications compete for bandwidth, thereby also intensifying fluctuations in quality.

Representations may be encoded as constant bit rate (CBR) versions or variable bit rate (VBR) versions. With CBR, the bitrate is well-controlled so that it is nearly constant. However, the complexity of content may change as a result of, for example, switching from relatively static (less complex) scenes to dynamic (more complex) scenes. Consequently, quality may fluctuate significantly unless the specified bitrate is sufficiently high to envelope the more complex scenes. However, the constant use of a higher bitrate, even for less complex scenes, means that bandwidth is wasted when those scenes are being sent over the network.

VBR may be unconstrained, or it may be constrained (the maximum bitrate is capped). With VBR, a higher bitrate can be allocated to more complex scenes and a lower bitrate can be allocated to less complex scenes. As a result, fluctuations in quality are relatively small, but quality still may not be consistent, particularly when VBR is constrained. Also, use of a higher bitrate may not necessarily improve quality, and consequently bandwidth is wasted when a higher bitrate is used but does not contribute to an improvement in quality.

To summarize, bitrate-driven adaptive streaming results in at least a couple of issues: fluctuations in quality, and inefficient use of bandwidth.

SUMMARY

Vigorous and frequent changes in bandwidth are often encountered in networks, for example, in wireless networks. Solutions for adaptive streaming are often designed with the aim of adapting to the changing bandwidth of the network while using as much bandwidth as possible. In the contemporary DASH (Dynamic Adaptive Streaming over HTTP) specification (e.g., ISO/IEC 23009-1), adaptations to changing bandwidth are enabled by switching between representations (or segments/sub-segments) based only on bitrate information; adaptation is realized by matching the bitrate of representations/segments/sub-segments to the available bandwidth.

As discussed above, adaptation to match the bitrate of the media content to the available bandwidth may result in significant fluctuations in the quality of the streamed content, which may negatively impact a viewer's experience; fluctuations in bandwidth can translate into fluctuations in quality. Also, bandwidth may be wasted; a higher bitrate does not necessarily mean higher quality, particularly for less complex scenes where a lower bitrate results in satisfactory quality.

In embodiments according to this disclosure, these issues are addressed by providing, to a client, a measure of the quality of the media data (e.g., a quality value). Embodiments according to this disclosure also pertain to how the presence of quality values is signaled to a client, how quality values are provided to a client, and how quality values are used by a client in adaptive streaming.

In embodiments according to the present disclosure, different representations are associated with an instance of media content (e.g., a movie), and a representation can include multiple portions (e.g., segments or sub-segments) of media content. A respective quality value can be associated with each of the portions. Information (e.g., an MPD (Media Presentation Description)) about the instance of media content is generated. The information includes quality information for the instance of media content. The information about the instance of content, including the quality information, can be accessed by and/or sent to a client. The quality information indicates the availability of the quality values and where those quality values reside and/or how they can be retrieved.

In one embodiment, a quality value for a portion of the instance of media content is included in a box (data structure) associated with that portion. In one such embodiment, in a DASH implementation, the quality value is included in the "sidx" box associated with the portion of interest. In such an embodiment, the quality information included in the information about the instance of media content (e.g., the MPD) includes an element (e.g., an Extensible Markup Language (XML) element) indicating the quality value is available in the box. This type of approach may be referred to as "in-band."

In one embodiment, the quality information included in the information about the instance of media content (e.g., the MPD) includes an element (e.g., an XML element), and a quality value for a portion of the instance of media content is an attribute of that element. This type of approach may be referred to as "out-of-band."

In one embodiment, a quality value for a portion of the instance of media content is included in a first file or location separate from (different from) any file(s) or location(s) containing the first portion of media content. In such an embodiment, the quality information included in the information about the instance of media content (e.g., the MPD) includes an element (e.g., an XML element) indicating the quality value is available in the first file and providing the location of that file. This type of approach may also be referred to as out-of-band.

To stream an instance of media content, a client can access the information about the instance of media content (e.g., the MPD), including the quality information. The client is made aware of the presence of quality values for the instance of media content and the location of the quality values via the quality information, as described above. The client can access the quality values, and then request a portion (e.g., a segment or sub-segment) of the instance of media content based on the quality value for that portion.

In one embodiment, a client can select a candidate set of portions of the instance of media content to be downloaded based on bitrate, and then replace a portion in the candidate set with another portion that has a different (e.g., lower) bitrate but still has a satisfactory quality value. While the media content is being downloaded, the client can adapt to changes in available bandwidth by replacing a portion in the candidate set with a different portion that is selected based not just on its bitrate but also based on its quality value.

In summary, embodiments according to the present disclosure enhance bitrate-driven adaptation with quality-aware adaptation. Quality as well as bitrate information is used to make more intelligent adaptation decisions. As a result, a more consistent level of quality can be provided. Furthermore, in contrast to adaptations driven only by bitrate, the highest bitrate representation (segment/sub-segment) may not always be selected for streaming. For example, in instances in which a satisfactory level of quality can be achieved with a lower bitrate segment versus a higher bitrate segment, then the lower bitrate segment can be selected. Consequently, available bandwidth is more efficiently used, and bandwidth is not consumed unnecessarily.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "identifying," "associating," "accessing," "requesting," "using", "indicating," "retrieving," "selecting," "replacing," "monitoring," "providing," "publishing," "measuring," "recording," and "generating," or the like, refer to actions and processes (e.g., flowcharts 400, 500, 700, 800, and 900 of FIGS. 4, 5, 7, 8, and 9, respectively) of a computer system or similar electronic computing device or processor (e.g., system 1000 of FIG. 10). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

For simplicity, embodiments according to the present disclosure may be discussed in the context of DASH (Dynamic Adaptive Streaming over HTTP (HyperText Transport Protocol)), in some instances using DASH terminology. However, it is understood that embodiments according to the present disclosure are not necessarily limited to a DASH implementation, and that the use of DASH terminology does not necessarily limit such embodiments to a DASH implementation.

Figure 1:
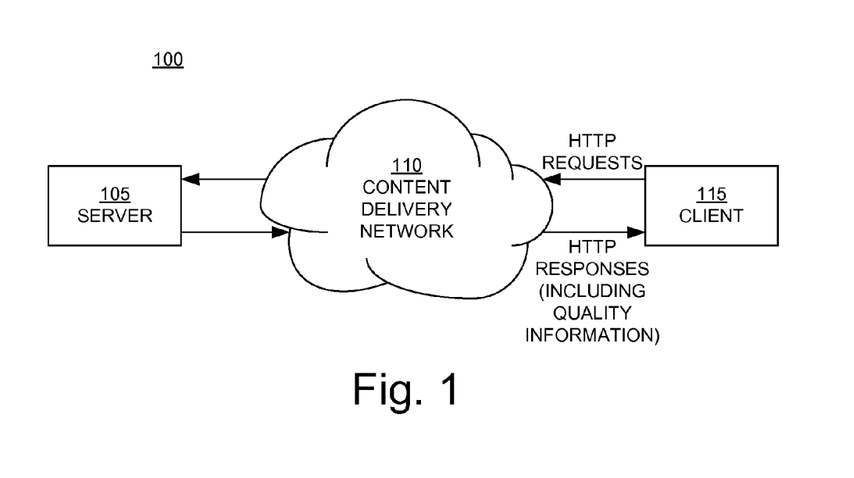
FIG. 1 is a block diagram showing examples of components of a system (e.g., a DASH system) upon which embodiments according to the present disclosure can be implemented.

FIG. 1 is a block diagram showing examples of components of a system 100 (e.g., a DASH system) upon which embodiments according to the present disclosure can be implemented. The server 105 is a source for different instances of media content, including recorded items (such as, but not limited to, movies) and live events (such as, but not limited to, a news or sports broadcast). The media content may include audio content and/or video content.

The instances of media content are variably encoded (compressed). That is, for example, the instances of media content may be encoded using different encoding schemes (codecs) and may have different resolutions and bandwidths (bitrates). An instance of media content may be based on the same raw content, but encoded differently. In other words, the same instance of content may be encoded at different resolutions and different bitrates using different codecs; each unique combination of resolution, bitrate, etc., may be referred to as a representation.

The server 105 may encode and otherwise process the instance of media content, or the instances of media content may be encoded and processed at another server and then transmitted to the server 105. The instances of media content can be transmitted to a client 115 via a content delivery network (CDN) 110.

The CDN 110 may be wired or wireless or a combination of both. In a DASH implementation, the CDN 110 utilizes HTTP because, for example, that allows the existing Web structure to be used for content streaming. Also, HTTP commands such as partial GET can be used.

The client 115 be a type of computing device such as, but not limited to, a laptop, desktop, tablet, notebook, cell phone, smart phone, media player, camera, gaming console, or the like.

Figure 2:
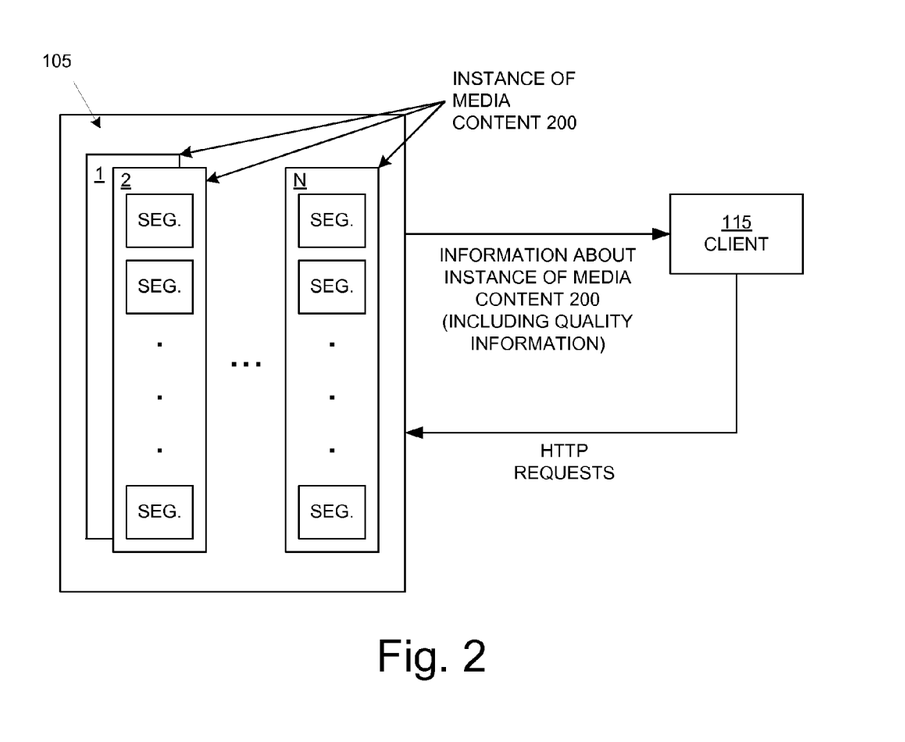
FIG. 2 illustrates representations of an instance of media content in an embodiment according to the present disclosure.

With reference to FIG. 2, representations 1, 2, . . . N of an instance of media content 200 are encoded at different bitrates, resolutions, aspect ratios, and the like. As mentioned above, an instance of media content 200 corresponds to the same raw content (e.g., a single movie); there may be different representations (at different bitrates, etc.) of a single instance of media content.

Each representation 1, 2, . . . , N may be divided into segments (SEG.), and each segment may be divided into sub-segments (not shown). Each segment or sub-segment represents a portion of the instance of media content 200; as used herein, a portion of an instance of media content may refer to a segment or to a sub-segment. Representations may be grouped into adaptation sets; an adaptation set can include one or more representations of a given time period within the instance of media content.

For example, an instance of media content may be logically divided into any number of time periods. One or more adaptation sets may be associated with each time period. One or more representations may be associated with each adaptation set. One or more portions may be associated with representation: one or more segments may be associated with each representation; and one or more sub-segments may be associated with each segment.

Information about each instance of media content available on the server 105 is published or broadcast in some manner that allows the client 115 to be made aware of the availability of that content. In a DASH implementation, information about an instance of media content is included in an MPD (a Media Presentation Description); an MPD is prepared and published for each instance of media content. An MPD is an XML (Extensible Markup Language) document that is accessible to clients. The information about an instance of media content (e.g., an MPD) describes properties of the various representations of that instance, such as bitrates, resolutions, and aspect ratios, and also describes how content can be retrieved from the server 105. For example, the information about an instance of media content can include Uniform Resource Locators (URLs) for each segment/sub-segment of that instance.

Significantly, in embodiments according to the present disclosure, the information about an instance of media content also includes quality information. In a DASH implementation, the quality information is included in the MPD.

Generally speaking, a measure of quality (e.g., one or more quality values) is generated and made available to the client 115. The measure of quality may be provided at the representation level (e.g., one quality value for all segments in a representation of an instance of media content) or at the segment/sub-segment level (a quality value per portion of an instance of media content). The quality information included in the information about an instance of media content indicates that a measure of quality is available for that instance. The quality information also indicates where quality values reside and/or how they can be retrieved.

The client 115 can use the measure of quality to make more intelligent decisions during adaptive streaming. More specifically, the client 115 can consider both bitrate and measure of quality when making decisions during adaptive streaming. Based on the bitrate and measure of quality, the client 115 can select suitable segments/sub-segments based on the bandwidth available in the network 110 (FIG. 1), and can retrieve those segments/sub-segments from the server 105 via HTTP requests.

The quality values may be provided "in-band" or "out-of-band." Below, the in-band and out-of-band approaches are described. Then, the generation of quality values and their use in adaptive streaming are described.

In-Band Approaches

Figure 3:
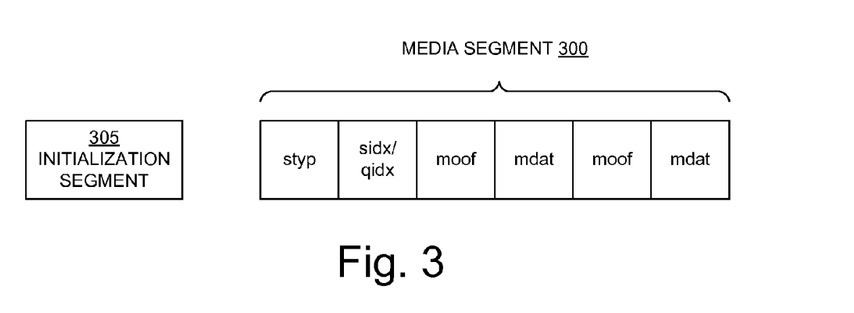
FIG. 3 illustrates an example of a portion of an instance of media content in an embodiment according to the present disclosure.

In some embodiments according to present disclosure, quality values are provided in-band; the quality values are provided with the data constituting the media content. FIG. 3 illustrates an example of a segment 300 in a DASH implementation. The segment 300 can be identified and accessed using its own URL, and can be downloaded to the client separately from another such segment.

Files conforming to the ISO (International Organization for Standardization) Base Media File Format are formed as a series of objects or data structures called "boxes." A box is, essentially, an object-oriented building block defined by a unique type identifier and includes a length field and a payload. The segment 300 includes a number of such boxes: styp; sidx; moof; and mdat.

The styp box designates the segment type. The sidx box contains index information for the segment 300. The moof box contains metadata for a fragment of the media content, and the mdat box contains the media data (e.g., audio and/or video frames) for that fragment. The initialization segment 305 specifies media content used to initialize the media content.

In an in-band embodiment, a measure of quality for the segment 300 is included in the sidx box. More specifically, in one embodiment, the information conventionally included in the sidx box is extended as shown in the example of Table 1.

In Table 1, asterisks (*) are used to identify the extended portion of the sidx box, "quality_value" is a value that indicates the quality of the media data in the referenced segment/sub-segment, and "scale_factor" controls the precision of the quality value.

TABLE 1

Example of Extended sidx Box

```
aligned(8) class SegmentIndexBox extends FullBox('sidx', version, 0) {
    unsigned int(32) reference_ID;
```

TABLE 1-continued

Example of Extended sidx Box

```
    unsigned int(32) timescale;
    if (version==0)
        {
            unsigned int(32) earliest_presentation_time;
            unsigned int(32) first_offset;
        }
    else
        {
            unsigned int(64) earliest_presentation_time;
            unsigned int(64) first_offset;
        }
    unsigned int(16) reserved = 0;
    unsigned int(16) reference_count;
    for(i=1; i <= reference_count; i++)
    {
        bit (1)                 reference_type;
        unsigned int(31)        referenced_size;
        unsigned int(32)        subsegment_duration;
        bit(1)                  starts_with_SAP;
        unsigned int(3)         SAP_type;
        unsigned int(28)        SAP_delta_time;
*       if (reference_type ==0);   //if media data is referenced   *
*       {                                                          *
*           unsigned int(16) quality_value                         *
*           unsigned int(16) scale_factor                          *
*       }                                                          *
    }
}
```

A qidx box can be defined as a relatively simple version of the sidx box for segments used in live streaming. The type of information that can be included in a qidx box is shown in the example of Table 2.

TABLE 2

Example of qidx Box

```
aligned(8) class SegmentIndexBox extends FullBox('qidx', version, 0) {
    unsigned int(32) reference_ID;
    unsigned int(16) quality_value;
    unsigned int(16) scale_factor;
}
```

The qidx box can be placed after the styp box, before the moof and mdat boxes.

In one embodiment, the quality information included in the information about the instance of media content (e.g., in the MPD) includes an element (e.g., an XML element) signaling the presence of a measure of quality in a segment box (e.g., the sidx box or qidx box) and indicating what quality metric is used. Table 3 defines an XML element that can be included in the MPD in a DASH implementation. In other words, in a DASH implementation, the MPD is extended to include a new element (QualityMetric).

In Table 3, the element name is "QualityMetric," and its attributes include "@schemeIDUri," "@value," and "@accuracy." The element may be applied at the adaptation set level or at the representation level.

TABLE 3

Example of an MPD Element and Attributes (In-band)

| Element or Attribute Name | Description |
| --- | --- |
| QualityMetric | Element name. |
| @schemeIdUri | Identifies the scheme. |
| @value | Indicates the metric used to express quality. |

TABLE 3-continued

Example of an MPD Element and Attributes (In-band)

| Element or Attribute Name | Description |
|---|---|
| @accuracy | Float type, indicating accuracy of the quality value for all segments. If not present, the quality value is rounded off to last digit. |

The measure of quality may be expressed as, for example, peak signal-to-noise ratio (PSNR), mean opinion score (MOS), or structural similarity index (SSIM).

In one embodiment, a qinfo box is defined and included in the initialization segment 305 to provide general information about quality metrics. The type of information that can be included in the qinfo box is shown in the example of Table 4.

TABLE 4

Example of qinfo Box

```
aligned(8) class SegmentIndexBox extends Box('qinfo') {
    unsigned int(4) metric_type
    unsigned int(28) reserved;
}
```

An in-band approach is advantageous because it can be implemented using the existing indexing mechanism (e.g., sidx), by extending the sidx box to include quality values, thereby maintaining backward compatibility. Also, additional files are not required to carry the quality values.

Out-of-Band Approaches

In some embodiments according to present disclosure, quality values are provided out-of-band.

In an out-of-band embodiment, the quality information included in the information about the instance of media content (e.g., in the MPD) includes an element (e.g., an XML element) that includes measure of quality (quality values as one its attributes. In other words, in a DASH implementation, the MPD is extended to include a new element (QualityTimeline).

Table 5 defines an example of an XML element that can be included in the MPD in a DASH implementation. In Table 5, the element name is "QualityTimeline," and its attributes include "@qualityMetric," "@scaleFactor," "@s," "@n," "@sf," "@q", and "@b." In one embodiment, the QualityTimeline element is applied at the segment level.

TABLE 5

Example of an MPD Element and Attributes (Out-of-band)

| Element or Attribute Name | Description |
|---|---|
| QualityTimeline | Element name. |
| @qualityMetric | Indicates what metric is used to express quality (e.g., PSNR, MOS, SSIM). |
| @scaleFactor | The default scale factor for the value of @q in all Q elements. |
| Q | 0 . . . N |
| @s | Segment number of the first segment contained in the element. When not present, it is the segment number of the first segment of the representation in the current period if this is the first Q element in QualityTimeline, or it is the |

TABLE 5-continued

Example of an MPD Element and Attributes (Out-of-band)

| Element or Attribute Name | Description |
|---|---|
|  | segment number of the segment next to the last segment contained in the previous Q element. |
| @n | Number of segments contained in the element sharing the same quality and bandwidth values. |
| @sf | Scale factor for value @q in the enclosing Q element. When present, it overrides @scaleFactor in parent element. When not present, @scaleFactor in QualityTimeline is used. |
| @q | Scaled value of the quality metric in integer. |
| @b | Bandwidth required for real time delivery of the segment, in kbps. If not present, the value of Representation@bandwidth attribute applies. |

Run-length coding can be used to compress the size of the QualityTimeline element. The Q element contains one or more (sub)segments with the same quality and bitrate; the number of (sub)segments in each Q element is indicated by the attribute @n. Quality and/or bitrate (the values of @q and/or @b) can be quantized so that (sub)segments with close quality and bitrate can be grouped together. The design of the QualityTimeline element enables non-linear quantization. A default value of the scale factor (@scaleFactor) can be present at the element level, and a scale factor can be present in each Q element; the latter value overrides the default scale factor. Bitrate and size can be derived from each other if the duration of each (sub)segment is known. However, bitrate can be expressed using fewer digits and less space. Bitrate (@b) is used in the Table 5 example. As bitrate can be obtained from the MPD, the Table 5 embodiment can be used even if a sidx box is not present in the media segment.

In another out-of-band embodiment, quality values are provided in a separate index file. That is, the quality values are included in a file (referred to herein as a quality index file) that is in a different location than any file or files containing the media content itself. In such an embodiment, the quality information included in the information about the instance of media content (e.g., in the MPD) includes an element (e.g., an XML element) that identifies the location of the quality index file. In other words, in a DASH implementation, the MPD is extended to include a new element (QualityIndex).

Table 6 defines an example of an XML element that can be included in the MPD in a DASH implementation. In Table 6, the element name is "QualityIndex," and its attributes include "@sourceURL" and "grange." In one embodiment, the QualityIndex element is applied at the representation level.

TABLE 6

Example of an MPD Element and Attributes (Out-of-band)

| Element or Attribute Name | Description |
|---|---|
| QualityIndex | Element name. |
| @sourceURL | The URL of the index file. |
| @range | Byte range within the index file. |

The type of information that can be included in a quality index file is shown in Table 7.

TABLE 7

Example of a Quality Index File

```
aligned(8) class QualityIndexEntry extends Box('qidx'){
    unsigned int(4)    quality_metric;
    unsigned int(4)    reserved;
    unsigned int(32)   num_quality_ranges;
    for ( i = 0; i < num_quality_ranges; i++ ) {
        unsigned int(32)   num_subsegments;
        unsigned int(32)   scale_factor;
        unsigned int(32)   quality_value;
    }
}
```

In Table 7, "quality_value" is a value that indicates the quality of the media data in the referenced representation, "scale_factor" controls the precision of the quality value, and "quality_metric" indicates the type of metric used to express quality (e.g., 1=PSNR, 2=MOS, 3=SSIM).

An out-of-band approach is advantageous because, for example, quality values can be carried and delivered separate from the media content, so that the quality values can be retrieved independently before the associated media segment is requested.

Preparation of Media Content

Figure 4:
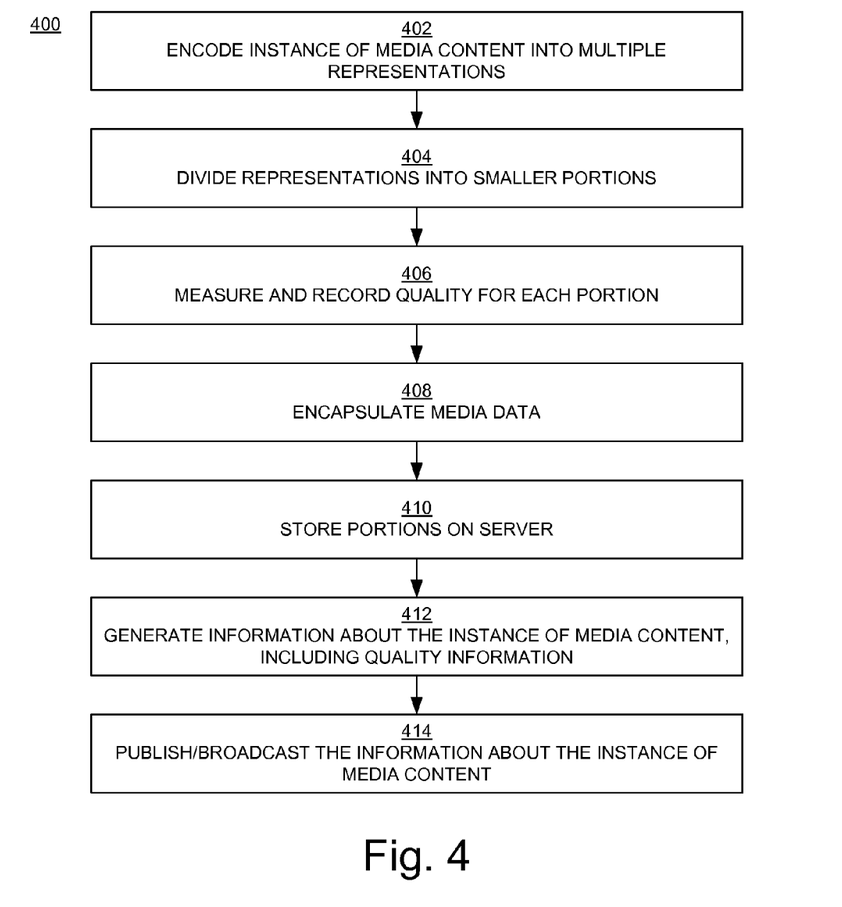
FIG. 4 is a flowchart of an example of a computer-implemented method for preparing media content, including quality information, in embodiments according to the present disclosure.

FIG. 4 is a flowchart 400 of an example of a computer-implemented method for preparing media content, including quality information, in embodiments according to the present disclosure. The flowchart 400 can be implemented as computer-executable instructions residing on some form of non-transitory computer-readable storage medium. The operations of the flowchart 400 can be implemented on the server side of the system 100 of FIG. 1 (e.g., by the server 105, or by one or more servers communicatively coupled to the server 105). Although described using a single instance of media content as an example, the operations can be readily extended to multiple instances of media content.

In block 402 of FIG. 4, an instance of media content is encoded into multiple representations with different bitrates. The content can be encoded in VBR or CBR.

In block 404, in one embodiment, each representation is divided into smaller portions (e.g., segments/sub-segments). The portions may be of different lengths (different time durations).

In block 406, the quality of each portion of each representation is measured and recorded. Techniques for measuring quality are known in the art.

In block 408, the representations are encapsulated into segment(s), which may be further divided into sub-segments.

In block 410, the portions (segments/sub-segments) are sent to and stored on a server (e.g., the server 105 of FIG. 1).

In block 412, information about the instance of media content (e.g., an MPD) is generated, describing what media content is available and how it can be accessed and retrieved. According to embodiments of the present disclosure, information about the instance of media content (e.g., an MPD) includes quality information (in-band or out-of-band). The quality information indicates that quality values are available, where those quality values reside, and/or how they can be retrieved.

In an in-band embodiment, in a DASH implementation, the quality information includes a QualityMetric element in the MPD, described above.

In an out-of-band embodiment, in a DASH implementation, the quality information includes a QualityTimeline element, described above.

In an out-of-band embodiment, in a DASH implementation, the quality information includes a QualityIndex element, described above.

In block 414, information about the instance of media content, including quality information (e.g., an MPD), is published and is accessible to a client, e.g., on a Web page, using a URL. A client can access the information about the instance of media content using, for example, a Web browser, e-mail, Short Message Service (SMS), etc.

Quality-Aware Adaptive Streaming

Figure 5:
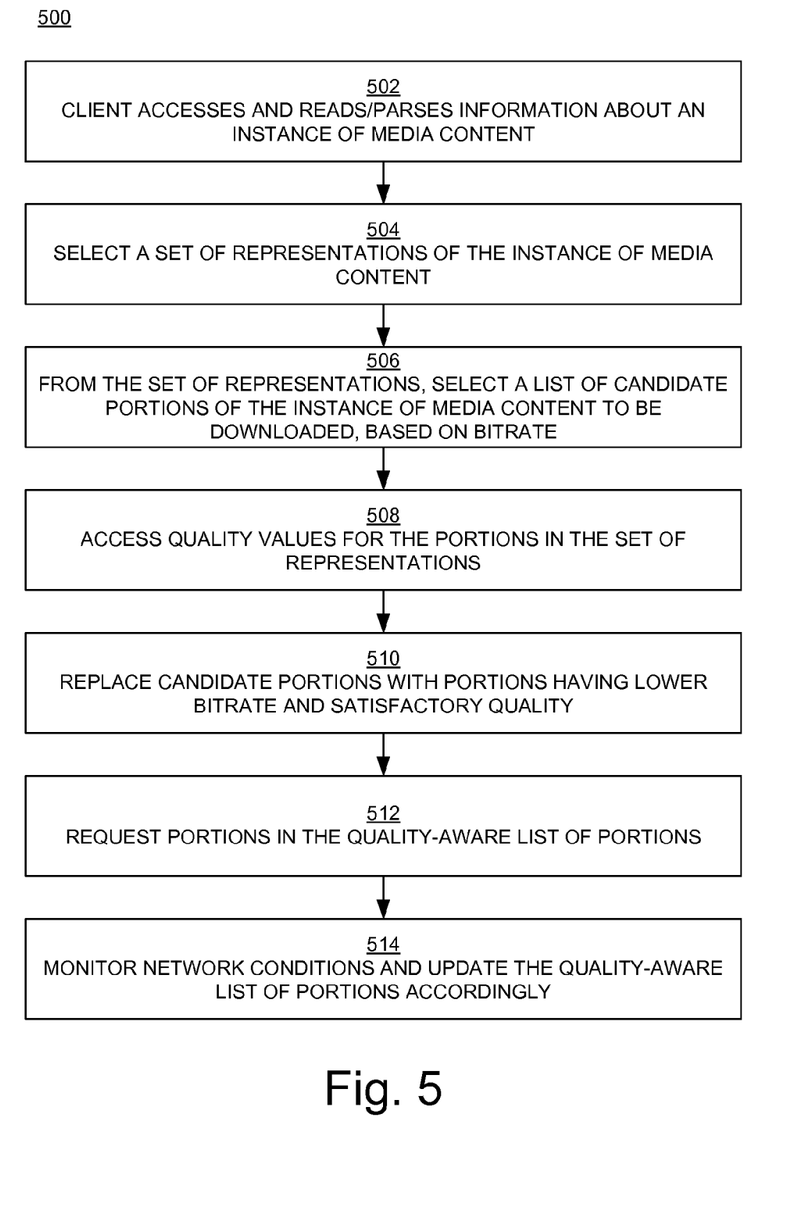
FIG. 5 is a flowchart of an example of a computer-implemented method for locating, accessing, and using quality values in embodiments according to the present disclosure.

FIG. 5 is a flowchart 500 of an example of a computer-implemented method for locating, accessing, and using quality values in embodiments according to the present disclosure. The flowchart 500 can be implemented as computer-executable instructions residing on some form of non-transitory computer-readable storage medium. The operations of the flowchart 500 can be implemented on the client side of the system 100 of FIG. 1 (e.g., by the client 115).

In block 502 of FIG. 5, a client accesses (reads or retrieves) information about an instance of media content (e.g., an MPD), including quality information. The client can parse the information about the instance of media content to identify which representations are available on the server 105 (FIG. 1) and their characteristics, such as bandwidth, resolution, the codec used, etc.

In one embodiment, in a DASH implementation, if the QualityMetric element described above is present, then the client knows that in-band quality information is available (e.g., quality values are in the sidx or qidx box).

In one embodiment, in a DASH implementation, if the QualityTimeline element described above is present, then client knows that out-of-band quality information is available (quality values are an attribute of that element).

In one embodiment, in a DASH implementation, if the QualityIndex element described above is present, then client knows that out-of-band quality information is available (quality values are in a separate quality index file, whose location is included in the element).

In block 504, the client selects a set of representations based on, for example, its capability or the user's preference.

In block 506 of FIG. 5, from the set of representations and using the information about the instance of content (e.g., the MPD), the client selects a list of candidate portions (segments/sub-segments) to be downloaded over time. In other words, the client creates a map of portion versus time over the length (in time) of the instance of media content. Essentially, the client selects a portion per time period. Initially, in one embodiment, the client selects the candidate portions based on bitrate. Generally speaking, at this point, the client will select portions at the highest bitrate it can handle (process).

Figure 6:
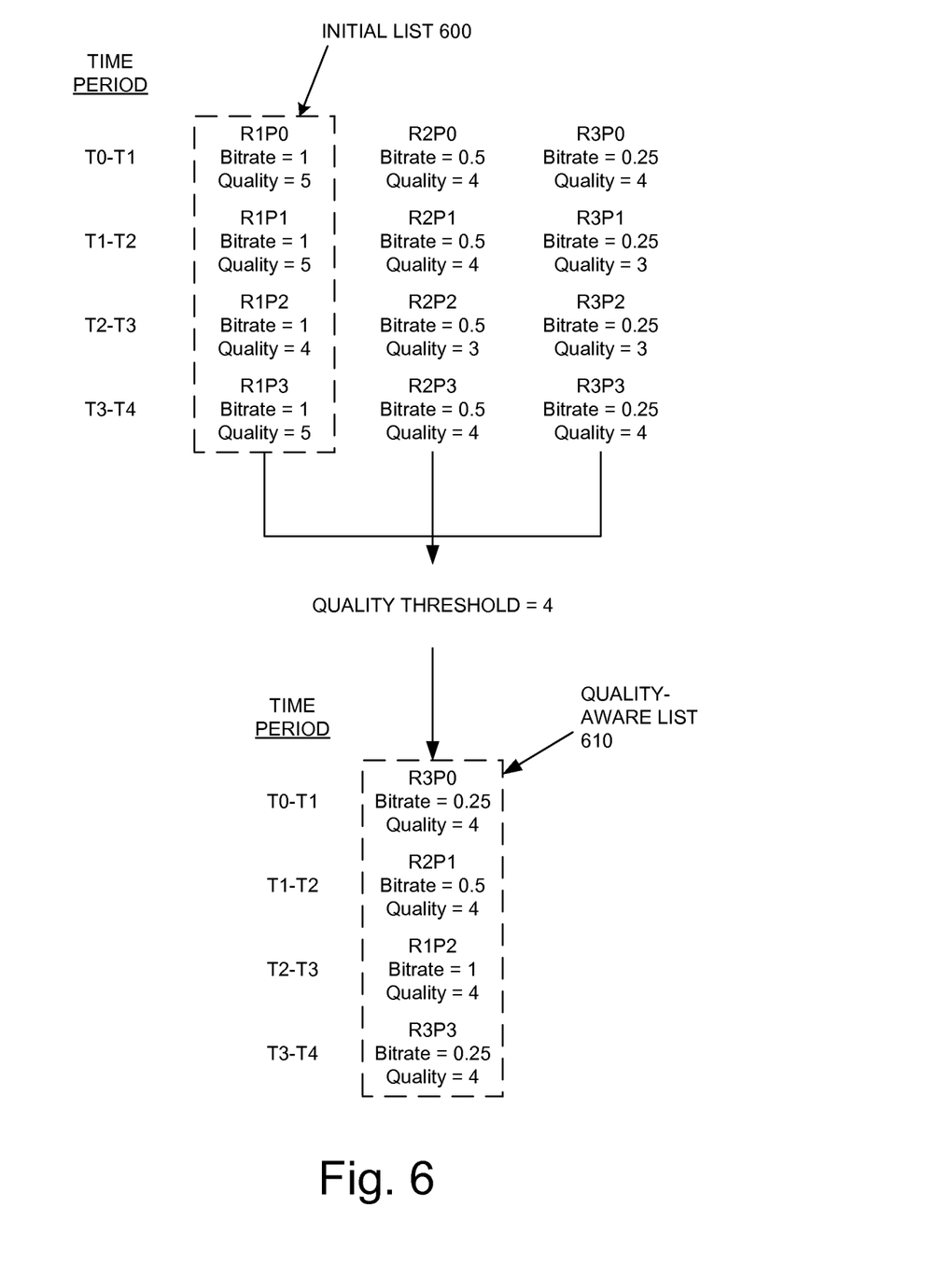
FIG. 6 is an example of a list of portions of an instance of media content selected based on quality values in embodiments according to the present disclosure.

FIG. 6 illustrates an example in which three different representations R1, R2, and R3 are selected by the client. The first portion of representation R1, for the time period from T0 to T1 (where T0 coincides with the beginning of the instance of media content), is identified as R1P0 and has a bitrate of 1 Mbps and a quality level of five (5) (arbitrary quality units are used in this example). Similarly, the first portion of representation R2, for the time period from T0 to T1, is identified as R2P0 and has a bitrate of 0.5 Mbps and a quality level of four (4); and the first portion of representation R3, for the time period from T0 to T1, is identified as R3P0 and has a bitrate of 0.25 Mbps and a quality level of three (3). Other portions, for different time periods, are similarly identified and have respective bitrates and quality levels as shown.

In block 506 of FIG. 5, based on bitrate, the initial list 600 of candidate portions would initially include R1P0, R1P1, R1P2, and R1P3.

In block 508, the client accesses (reads) the quality values for the portions in the selected set of representations (R1, R2, and R3).

In an in-band embodiment, the client can obtain quality values from the sidx box or the qidx box. The client does not necessarily have to request each portion (e.g., an entire media segment) to obtain the quality values. Instead, the client can request the relatively small part of the portion that constitutes the sidx or qidx box. For example, for each portion in the selected set of representations (R1, R2, and R3), the client can request the sidx or qidx box using the HTTP partial GET command and retrieve a quality value from the box.

In an out-of-band embodiment, the client can obtain quality values from the information about the instance of media content itself (e.g., from the MPD itself).

In another out-of-band embodiment, the client can obtain quality values from the quality index file(s) specified in the information about the instance of media content (e.g., specified in the MPD).

In block 510, the client can replace portions in the initial list 600 of candidate portions with lower bitrate portions that have satisfactory quality. In one embodiment, the client can compare the quality value for each portion against a pre-defined requirement such as a threshold value. A quality requirement can be a pre-defined value based on, for example, historical experience or user preferences, or it can be a dynamic value derived from the quality level of (sub)segments that have been downloaded. If the quality value for a portion satisfies the quality requirement, then that portion can be replaced in the list with a lower bitrate portion. In one embodiment, the portion with a quality value closest to a threshold value is selected, regardless of its associated bitrate. In another embodiment, the portion with a quality value that is highest but does not exceed the threshold value is selected, regardless of its associated bitrate.

In the example of FIG. 6, the quality threshold is 4 (this is an arbitrary value chosen for illustration purposes). For the time period T0-T1, the portions R1P0, R2P0, and R3P0 all satisfy the quality threshold. However, R3P0 is selected because it has the lowest bitrate, and R3P0 replaces R1P0 in the quality-aware list 610 of candidate portions. In similar fashion, R2P1 is chosen to replace R1P1, and R3P3 is chosen to replace R1P3.

Consequently, in contrast to conventional approaches, the portion (segment/sub-segment) with the highest possible bitrate will not necessarily be requested and downloaded by the client. Accordingly, bandwidth is saved.

In this manner, the client can construct a detailed quality-aware list 610 of quality and bitrate over time for portions of the instance of media content. To reduce startup delay, this can be done after streaming starts in background.

Significantly, in contrast to conventional approaches, the portion (segment/sub-segment) with the highest possible bitrate will not necessarily be requested and downloaded by the client. Accordingly, bandwidth is saved.

In block 512 of FIG. 5, the client requests portions (segments or sub-segments) off the list 610 in sequence. Basically, the client works through the list 610 of candidate portions, requesting each portion in turn.

In block 514, the client monitors network conditions, particularly available bandwidth. If the client is about to request a particular portion, but the available bandwidth decreases to less than the bitrate for that portion, then the client can select another portion having a bitrate that satisfies the available bandwidth. For example, the client can access information indicating an amount of available bandwidth in the network at a point in time, and can replace a portion in the list 610 scheduled to be downloaded in an interval spanning the point in time, with another portion that has a respective bitrate value that satisfies the amount of available bandwidth. If the client can choose a replacement from multiple portions (e.g., segments) at different bitrates, then quality level can be used to choose the replacement in a manner similar to that just described. In other words, if a portion P1 is to be replaced in the list 610 by either a portion P2 or a portion P3, and portion P2 has a lower bitrate then portion P3 but the same or similar quality level, then the portion P2 can be chosen.

Figure 7:
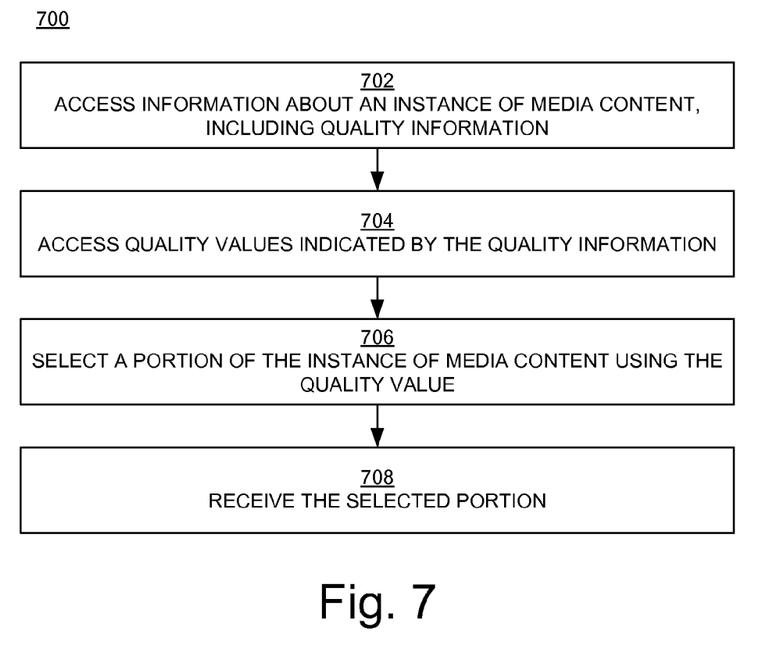
FIGS. 7 and 8 are flowcharts of examples of computer-implemented methods for accessing and using quality values in embodiments according to the present disclosure.
Figure 8:
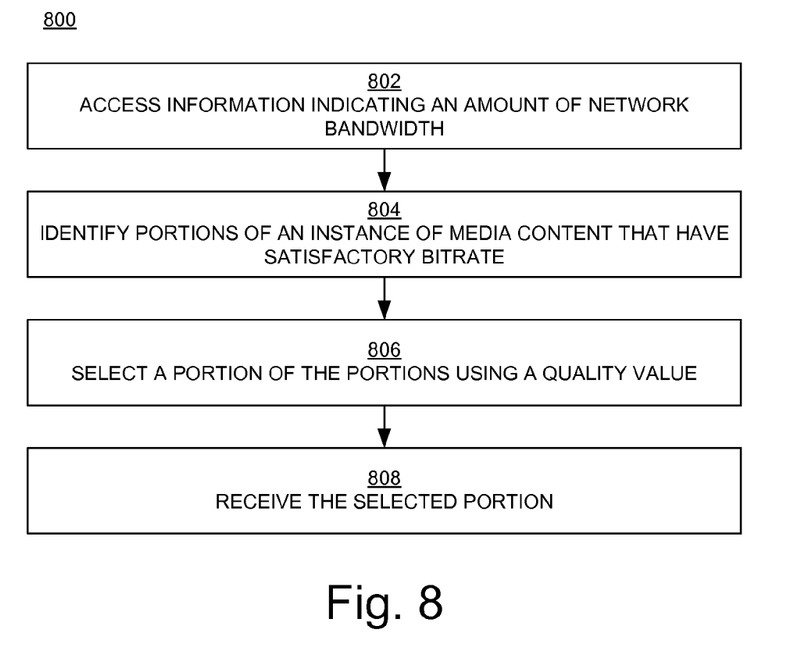

FIGS. 7 and 8 are flowcharts 700 and 800, respectively, of examples of computer-implemented methods in embodiments according to the present disclosure. The flowcharts 700 and 800 can be implemented as computer-executable instructions residing on some form of non-transitory computer-readable storage medium. In particular, the operations included in the flowcharts 700 and 800 can be implemented on the client side of the system 100 of FIG. 1 (e.g., by the client 115).

In block 702 of FIG. 7, information about an instance of media content is accessed (e.g., an MPD is accessed). The information includes quality information that indicates quality values for portions of the instance of media content. The quality values may be in-band or out-of-band, and the quality information indicates both the presence of the quality values and their locations.

In block 704, the quality values indicated by the quality information are accessed.

In block 706, a portion of the instance of media content is accessed. The portion is selected using a quality value for the first portion.

In block 708, the first portion is received.

In block 802 of FIG. 8, information indicating an amount of available bandwidth in a content delivery network is accessed.

In block 804, portions of an instance of media content are identified. The portions have a respective bitrate that satisfies the amount of available bandwidth. The portions also have respective measures of quality (quality values) associated therewith.

In block 806, a first portion of the portions is selected to be downloaded. The first portion is selected according to its associated measure of quality.

In block 808, the first portion is requested for delivery over the content delivery network.

Figure 9:
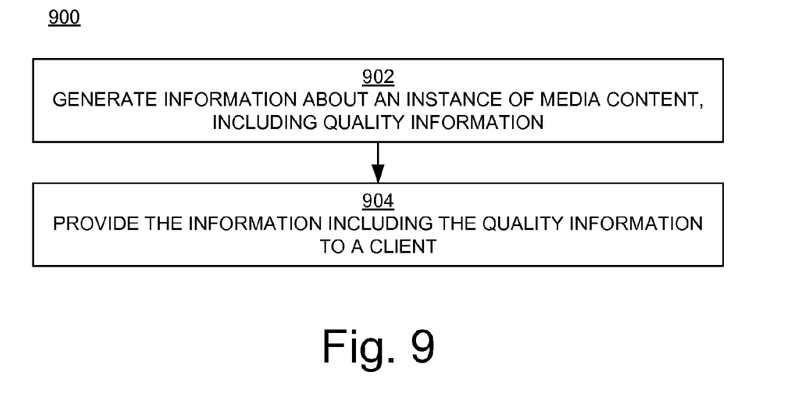
FIG. 9 is a flowchart of an example of a computer-implemented method for providing quality values in embodiments according to the present disclosure.

FIG. 9 is a flowchart 900 of an example of a computer-implemented method in embodiments according to the present disclosure. The flowchart 900 can be implemented as computer-executable instructions residing on some form of non-transitory computer-readable storage medium. The operations of the flowchart 900 can be implemented on the server side of the system 100 of FIG. 1 (e.g., by the server 105, or by one or more servers communicatively coupled to the server 105).

In block 902 of FIG. 9, information about an instance of media content is generated. The information includes quality information for the instance of media content. Each portion of the instance of media content has a respective quality value associated therewith.

In block 904, the information, included the quality information, is provided to a client. The quality information indicates the availability of the quality values and how to find them, as previously described herein.

In summary, embodiments according to the present disclosure enhance bitrate-driven adaptation with quality-aware adaptation. Quality as well as bitrate information is used to make more intelligent adaptation decisions. As a result, a more consistent level of quality can be provided. Furthermore, in contrast to adaptations driven only by bitrate, the highest bitrate representation (segment/sub-segment) may not always be selected for streaming. For example, in instances in which a satisfactory level of quality can be achieved with a lower bitrate segment versus a higher bitrate segment, then the lower bitrate segment can be selected. Consequently, available bandwidth is more efficiently used, and bandwidth is not consumed unnecessarily.

Both network operators (content providers) and content subscribers can benefit. An operator can benefit because, by using network resources more efficiently, more subscribers can be accommodated. Subscribers benefit because they can stream content at an acceptable level of quality while spending less on data plans that are based on consumption. Also, energy consumed by client devices can be reduced, which is particularly meaningful for power-constrained mobile devices, as power consumption is directly related to bandwidth usage.

Figure 10:
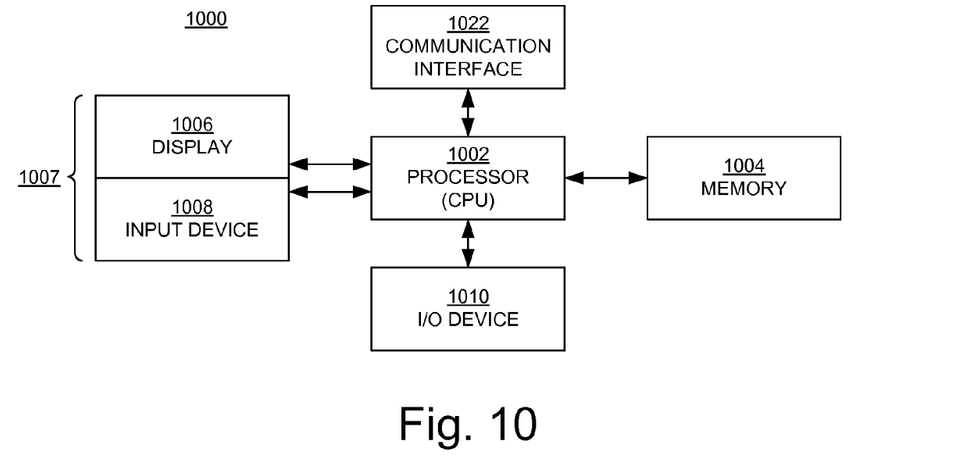
FIG. 10 is a block diagram of an example of a computing system upon which embodiments according to the present disclosure can be implemented.

FIG. 10 is a block diagram of an example of a computing system 1000 capable of implementing embodiments according to the present disclosure. The computing system 1000 broadly represents any single or multi-processor computing device or system capable of executing computer-readable instructions. The computing system 1000 can be used to implement the functionality provided by the server 105 of FIG. 1 or any of the other server components in the system 100. The computing system 1000 can also be used to implement the functionality of the client 115 of FIG. 1. Depending on the implementation, the computing system 1000 may not include all of the elements shown in FIG. 10, and/or it may include elements in addition to those shown in FIG. 10.

In its most basic configuration, the computing system 1000 may include at least one processor 1002 (CPU) and at least one memory 1004. The processor 1002 generally represents any type or form of processing unit capable of processing data or interpreting and executing instructions. In certain embodiments, the processor 1002 may receive instructions from a software application or module. These instructions may cause the processor 1002 to perform the functions of one or more of the example embodiments described and/or illustrated herein.

The memory 1004 generally represents any type or form of volatile or non-volatile storage device or medium capable of storing data and/or other computer-readable instructions. In certain embodiments the computing system 1000 may include both a volatile memory unit (such as, for example, the memory 1004) and a non-volatile storage device (not shown).

The computing system 1000 also includes a display device 1006 that is operatively coupled to the processor 1002. The display device 1006 is generally configured to display a graphical user interface (GUI) that provides an easy to use interface between a user and the computing system.

The computing system 1000 also includes an input device 1008 that is operatively coupled to the processor 1002. The input device 1008 may include a touch sensing device (a touch screen) configured to receive input from a user's touch and to send this information to the processor 1002. The processor 1002 interprets the touches in accordance with its programming.

An input device 1008 may be integrated with the display device 1006 or they may be separate components. In the illustrated embodiment, the input device 1008 is a touch screen that is positioned over or in front of the display device 1006. The input device 1008 and display device 1006 may be collectively referred to herein as a touch screen display 1007.

The communication interface 1022 of FIG. 10 broadly represents any type or form of communication device or adapter capable of facilitating communication between the example computing system 1000 and one or more additional devices. For example, the communication interface 1022 may facilitate communication between the computing system 1000 and a private or public network including additional computing systems. Examples of a communication interface 1022 include, without limitation, a wired network interface (such as a network interface card), a wireless network interface (such as a wireless network interface card), a modem, and any other suitable interface. In one embodiment, the communication interface 1022 provides a direct connection to a remote server via a direct link to a network, such as the Internet. The communication interface 1022 may also indirectly provide such a connection through any other suitable connection. The communication interface 1022 may also represent a host adapter configured to facilitate communication between the computing system 1000 and one or more additional network or storage devices via an external bus or communications channel.

As illustrated in FIG. 10, the computing system 1000 may also include at least one input/output (I/O) device 1010. The I/O device 1010 generally represents any type or form of input device capable of providing/receiving input or output, either computer- or human-generated, to/from the computing system 1000. Examples of an I/O device 1010 include, without limitation, a keyboard, a pointing or cursor control device (e.g., a mouse), a speech recognition device, or any other input device.

Many other devices or subsystems may be connected to computing system 1000. Conversely, all of the components and devices illustrated in FIG. 10 need not be present to practice the embodiments described herein. The devices and subsystems referenced above may also be interconnected in different ways from that shown in FIG. 10. The computing system 1000 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into the computing system 1000. All or a portion of the computer program stored on the computer-readable medium may then be stored in the memory 1004. When executed by the processor 1002, a computer program loaded into the computing system 1000 may cause the processor 1002 to perform and/or be a means for performing the functions of the example embodiments described and/or illustrated herein. Additionally or alternatively, the example embodiments described and/or illustrated herein may be implemented in firmware and/or hardware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A client device, comprising:
a processor;
memory coupled to the processor, the memory have stored therein instructions that, if executed by the device, cause the device to perform operations comprising:
accessing information about an instance of media content, the information comprising quality information that indicates availability of quality values for portions of representations of the instance of media content, each representation having a plurality of portions associated with different time periods, the portions of the representations having a respective bitrate associated therewith, the quality values comprising measures of quality of the portions of the representations of the instance of media content;
accessing the quality values indicated by the quality information;
determining an original list comprising identifiers of a candidate set of the portions, wherein all portions in the candidate set are respectively associated with different time periods;
updating the original list by replacing an identifier of a first candidate portion of the candidate set of the portions with an identifier of a first alternative portion before the client device requests portions identified by the original list, wherein the first alternative portion has a bitrate lower than the first candidate portion, and wherein the first candidate portion and the first alternative portion are associated with a first time period; and
requesting all portions identified by the updated list.

2. The device of claim 1, wherein the quality value of the first candidate portion is included in a box associated with the first candidate portion, wherein said accessing the quality values comprises retrieving the quality value of the first candidate portion from the box prior to requesting the first candidate portion.

3. The device of claim 2, wherein the quality information comprises an element indicating the quality value of the first candidate portion is available in the box.

4. The device of claim 1, wherein the quality information comprises an element, wherein the quality value of the first candidate portion is an attribute of the element.

5. The device of claim 1, wherein the quality value of the first candidate portion is included in a first file in a location different from a second file comprising the first alternative portion.

6. The device of claim 5, wherein the quality information comprises an element indicating the quality value of the first candidate portion is in the first file, wherein said accessing the quality values comprises retrieving the quality value from the first file prior to requesting the first candidate portion.

7. The device of claim 1, wherein the candidate set of the portions are selected based on bitrates and quality values of portions of the candidate set, wherein the device performs further operations:
monitoring a network used to transmit all the portions identified by the updated list to the client;
requesting, when bandwidth of the network is lower than bandwidth of a portion identified by the updated list, another alternative portion rather than the portion, wherein bandwidth of the another alternative portion is lower than the bandwidth of the portion identified by the updated list, wherein the portion identified by the updated list and the another alternative portion are associated with a second time period.

8. A non-transitory computer-readable storage medium having computer-executable instructions that, when executed, cause a client device to perform a method, the method comprising:
- accessing information indicating an amount of available bandwidth in a content delivery network;
- identifying portions of representations of an instance of media content, each representation having a plurality of portions associated with different time periods, the portions of representations having a respective bitrate that satisfies the amount of available bandwidth, the portions also having respective measures of quality associated therewith;
- determining an original list comprising identifiers of a candidate set of the portions, wherein all portions in the candidate set are respectively associated with different time periods;
- updating the original list by replacing an identifier of a first candidate portion of the candidate set of the portions with an identifier of a first alternative portion before the client device requests portions identified by the original list, wherein the first alternative portion has a bitrate lower than the first candidate portion, wherein the first candidate portion and the first alternative portion are associated with a first time period; and
- requesting all portions identified by the updated list.

9. The non-transitory computer-readable storage medium of claim 8, wherein the method further comprises accessing information about the instance of media content, wherein further the information about the instance of media content comprises an element indicating the measure of quality for the first candidate portion is available in a box associated with the first candidate portion and the measure of quality is retrieved from the box prior to requesting the first candidate portion.

10. The non-transitory computer-readable storage medium of claim 8, wherein the method further comprises accessing information about the instance of media content, wherein further the information about the instance of media content comprises an element and the measure of quality for the first candidate portion is an attribute of the element.

11. The non-transitory computer-readable storage medium of claim 8, wherein the method further comprises accessing information about the instance of media content, wherein further the information about the instance of media content comprises an element indicating the measure of quality for the first candidate portion is available in a first file in a location different from a second file comprising the first candidate portion, and the measure of quality is retrieved from the box prior to requesting the first portion.

12. A method, comprising:
- accessing information about an instance of media content, the information comprising quality information that indicates availability of quality values for portions of representations of the instance of media content, each representation having a plurality of portions associated with different time periods, the portions of the representations having a respective bitrate associated therewith, the quality values comprising measures of quality of the portions of the representations of the instance of media content;
- accessing the quality values indicated by the quality information;
- determining an original list comprising identifiers of a candidate set of the portions, wherein all portions in the candidate set are respectively associated with different time periods;
- updating the original list by replacing an identifier of a first candidate portion of the candidate set of the portions with an identifier of a first alternative portion before the client device requests portions identified by the original list, wherein the first alternative portion has a bitrate lower than the first candidate portion, and wherein the first candidate portion and the first alternative portion are associated with a first time period; and
- requesting all portions identified by the updated list.

* * * * *